United States Patent [19]

Prahs

[11] Patent Number: 5,383,577
[45] Date of Patent: Jan. 24, 1995

[54] PLASTIC TUBE PRODUCED BY BLOW MOLDING

[75] Inventor: Harald Prahs, Wentorf, Germany

[73] Assignee: Colgate-Palmolive Company, New York, N.Y.

[21] Appl. No.: 224,406

[22] Filed: Apr. 7, 1994

Related U.S. Application Data

[63] Continuation of Ser. No. 819,428, Jan. 10, 1992, abandoned.

[30] Foreign Application Priority Data

Jan. 12, 1991 [DE] Germany ............... 4100757

[51] Int. Cl.6 .................. B65D 35/08
[52] U.S. Cl. .................. 222/107; 428/40
[58] Field of Search ............ 222/92, 107, 556; 428/40, 34.3; 206/277; 383/105, 121

[56] References Cited

U.S. PATENT DOCUMENTS

| | | | |
|---|---|---|---|
| 2,136,007 | 11/1938 | Gish | 222/92 |
| 2,476,446 | 7/1949 | Lindell | 222/107 |
| 4,087,028 | 5/1978 | Lang | 222/556 |
| 4,088,166 | 5/1978 | Miller | 222/107 X |
| 4,126,249 | 11/1978 | Wood | 222/92 |
| 4,308,904 | 1/1982 | Martin et al. | 150/0.5 |
| 4,394,936 | 7/1983 | Shavit | 222/107 |
| 4,921,137 | 5/1990 | Heijenga | 222/107 |
| 5,080,260 | 1/1992 | Düring | 222/107 |
| 5,156,303 | 10/1992 | Yamamoto et al. | 222/107 X |
| 5,167,349 | 12/1992 | Rodder et al. | 222/107 |
| 5,169,030 | 12/1992 | Lewin | 222/107 X |
| 5,174,458 | 12/1992 | Segati | 222/107 X |
| 5,299,689 | 4/1994 | Ledewitz | 222/107 X |

FOREIGN PATENT DOCUMENTS

| | | |
|---|---|---|
| 2540073 | 1/1984 | France . |
| 2598681 | 5/1986 | France . |
| 1100936 | 1/1963 | Germany . |
| 1896894 | 7/1964 | Germany . |
| 7001314 | 6/1970 | Germany . |
| 7024243 | 6/1970 | Germany . |
| 2347528 | 11/1974 | Germany . |
| 7833038 | 7/1978 | Germany . |
| 3739016 | 5/1989 | Germany . |
| 2159116 | 11/1985 | United Kingdom . |

OTHER PUBLICATIONS

Verpackungsrundschau, pp. 397, 398–1953–German Periodical.

Primary Examiner—Andres Kashnikow
Assistant Examiner—Kenneth DeRosa
Attorney, Agent, or Firm—Michael J. McGreal; Robert C. Sullivan

[57] ABSTRACT

A plastic tube produced by blow molding has a main section with an essentially constant cross-section over its length, which is formed by an even number of level wall sections. The wall sections are located opposite to each other and preferably have the same width. At the front end of the main section there is a tubular opening section with a smaller diameter than that of the main section. The rear end the main section converges to an essentially straight end edge which lies in a plane extending through the central longitudinal axis of the main section and which joins two longitudinal edges of the main section to form the end edge.

10 Claims, 2 Drawing Sheets

PLASTIC TUBE PRODUCED BY BLOW MOLDING

This application is a continuation of application Ser. No. 7,819,428 filed Jan. 10, 1992 now abandoned.

BACKGROUND OF THE INVENTION

This invention relates to a plastics tube having a generally rectangular shape produced by blow molding. More particularly this invention relates to a plastic tube having a main section which has an essentially constant cross-section over its length, at the front end of which there is a tubular opening section with a smaller diameter than the main section and which converges at the rear end to an essentially straight end edge, which edge lies in a plane which runs through the central longitudinal axis of the main section and which end edge lies within the enveloping curve of the outer surface of the walls of the main section.

Plastic tubes of this kind are used for example for skin creams and the like. The main section of these prior art tubes has an oval or somewhat circular cross-section and can be relatively easily pressed together to thus discharge the contents of the tube through the opening in the top part of the tube. A deformation is also possible by pressing together the waft areas which converge to the end edge.

These known plastic tubes are packaged for transport and for shop display in single cartons which have printed on them all sorts of information about the contents of the carton or tube. The cartons also protect the enclosed plastic tube against damage and form a shape conducive for a large number of plastic tubes to be combined to form a shape which allows a large number of plastic tubes to be combined to form a larger package in which the individual cartons can lie flat against one another and thus allow a surrounding box to be tightly filled.

Thus, while the usual flat stacking of cartons, each containing a tube, within a box leads to easily handled packaging which protects the tubes satisfactorily against damage, the need to pack every single tube in a corresponding carton is a considerable cost factor. A further consequence is that the cartons also lead to disposal problems or to environmental pollution for consumers.

The aim of this invention is to provide a tube which can be tightly packed without using a carton which envelops it, and which in particular allows a substantial number of identical tubes to be combined to form a satisfactorily transportable package.

BRIEF DESCRIPTION OF THE INVENTION

In order to achieve this aim a plastic tube of the above mentioned type is designed according to the present invention so that the main section is formed by an even number of flat wall sections whose wall sections are located opposite to each other and each has the same width. Further the end edge joins together two longitudinal edges of the main section. Preferably, the main section has four wall sections with adjacent wall sections forming a right angle in the area of the associated longitudinal edges. The width of all the wall sections can be the same, i.e. the main section can have a quadratic cross-section.

A benefit of the design of the invention of the main section of the plastic tube is the fact that the end edge does not project beyond the enveloping curve formed by the planes of the wall sections of the main section. Therefore it is possible to combine several plastic tubes with level or flat wall sections of the same dimensions lying against one another to form a package, so that the plastic tubes can be held flat and in a defined position in the package in the same way as prior tube containing cartons.

As already mentioned, the end edge of the plastic tube terminates within the enveloping curve of the main section, so that the end edge does not prevent the main sections of the plastic tubes from being placed against one another or their consequent combination to form a package.

Furthermore, due to the arrangement of the end edge as the connection of two longitudinal edges of the main section, the plastic tube is more flexible in the area of the taper towards the end edge. The longitudinal edges formed by adjacent wall sections can be easily pressed together by the user in this area, to thus discharge the tube contents through the opening section without expending great effort to deform the tube.

The plastic tube according to the invention is produced by blow molding, i.e., a heated tubular blank is inserted into a corresponding mold and then pressed by increased internal pressure against the walls of the mold so that the blank assumes the desired shape of the mold in which the end edge does not project beyond the enveloping curve of the main section of the plastic tube.

In comparison, the initial step in the manufacture of normal aluminium tubes is to draw a tubular section which has a tubular opening section at the front end and is filled from the open rear end. After filling, the rear end of the tubular section is pressed together and usually folded over, so that an "end edge" is formed, which, however, because of the deformation of the tubular cross-section into a straight end projects radially beyond the dimensions of the tubular section. The length of the end edge is thus greater than the diameter of the tubular section lying in the same plane which extends through the central longitudinal axis of the tubular section.

This, however, is not the case with the tube according to the invention.

While conventional tubes made of aluminium, as mentioned above, are filled from the open rear end and thus a large opening cross-section is available for the filling process, filling of the tube according to the invention, which is closed at the rear end, takes place through the tubular opening cross-section formed at the front end, which also serves to discharge the tube contents. While in general a relatively small opening cross-section is desired for discharging the tube contents, there should be as large as possible an opening cross-section for filling, so that the filling process can be carried out quickly, and the filler devices for filling from the rear end can be used.

In order to solve this problem with the plastic tube according to the invention, the opening cross-section of the tubular opening section is designed to be relatively large so that a speedy filling with the existing filling devices can be effected. After filling, a discharge section whose opening cross-section at the free end is smaller than that of the opening section is pressed onto the opening section, so that the contents of the tube are discharged through an area with relatively small opening cross-section.

It should be noted that the plastic tube according to the invention can be blow-molded in one layer or multiple layers. With the two layer version, where the two layers are co-extruded, a flexible, permeable plastic layer is provided on the exterior, whilst the inner layer is formed from a thick, impermeable plastic material. With the single-layer version, the tube wall is formed from a single plastic layer.

DETAILED DESCRIPTION OF THE INVENTION

Figure 1:
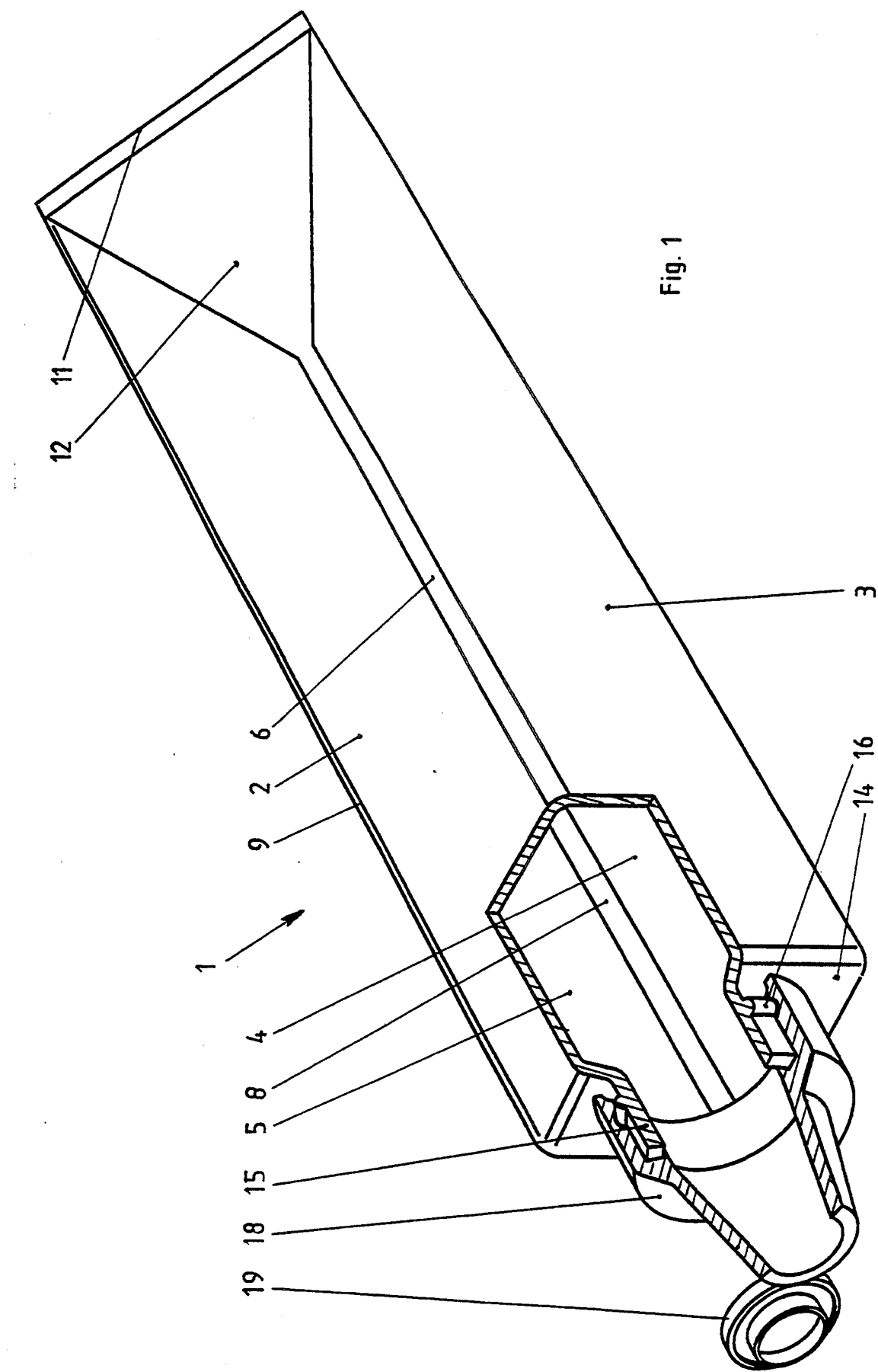
FIG. 1 is a perspective and partly exploded view of a plastic tube.

The plastic tube shown in FIG. 1 has a main section I which has wall sections 2, 3, 4, 5, which are all preferably the same width and form a quadratic cross-section. The wall sections 2 and 3 are joined to each other by a longitudinal edge 6, wall sections 4 and 5 by a longitudinal edge 8 and wall sections 2 and 5 by a longitudinal edge 9, whereas the wall sections 3 and 4 are joined together by a longitudinal edge which is not shown and is not recognizable in the drawing. At the rear end of the thus formed, tubular main section there is an end edge 11 which joins together the longitudinal edge 9 and the longitudinal edge connecting wall sections 3 and 4 and from which wedge-shaped wall sections extend, of which the wedge-shaped waft section 12 tapers forward, ending at the longitudinal edge 6. A wedge-shaped wall section of the same shape runs from the end edge 11 to the longitudinal edge 8, i.e., it lies opposite the wedge-shaped wall section 12.

As can be seen, the length of the end edge 11, which seals the plastic tube at the rear end and which lies in a plane with the central longitudinal axis of the main section 1, is not greater than the distance between the longitudinal edges of the enveloping curve of the outside surface of the main section 1.

At the front end of the main section 1 there is a transverse wall 14 projecting inwards from the wall sections 2, 3, 4, 5, beyond which a tubular opening section 15 projects centrally. A circular rib 16 is formed at the outer face of the opening section 15.

A forward-tapering, tubular discharge section 18 is pressed onto the tubular opening section 15 and, with an annular groove on its interior, made to engage with the circular rib 16 of the opening section 15, so that a type of snap connection is formed, which does not come apart in normal use. A sealing cap 19 which can be clamped into the front end of the discharge section 18, is swivellably secured by means of a web (not shown) on the outer edge of the discharge section 18.

Figure 2:
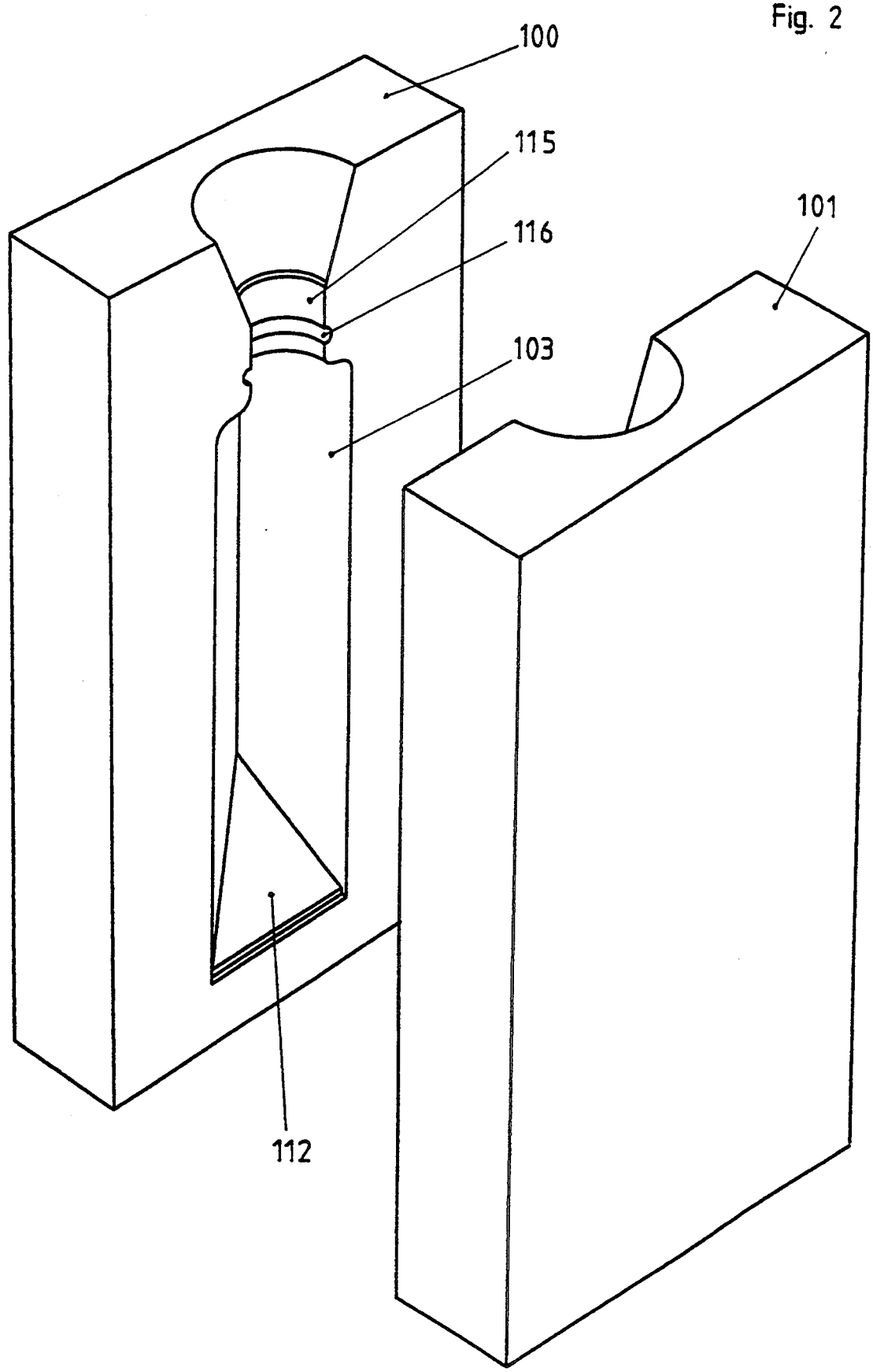
FIG. 2 is a diagrammatic and simplified perspective view of the two mold halves for producing a plastic tube according to FIG. 1 by the blow molding process.

The plastic tube shown is produced by blow molding, for which a mold can be used as diagrammatically shown in FIG. 2. This mold consists of two identical mold halves 100 and 101, which each have a mold cavity corresponding in shape to the half of the plastic tube which lies to one side of the plane containing the end edge 11.

In order to produce the plastic tube a heated, tubular plastic blank is introduced into the mold and the two mold halves are brought together so that the mold cavity is essentially sealed. Then the pressure in the inside of the mold blank is increased and the plastic material is presses against the mold walls. Mold wall 112 forms the wedge-shaped planar surface 12. Mold wall 103 wall forms section 3. Mold wall 115 forms one half of the opening section 15, and recess 116 in the mold wall 115 one half of the circular rib 16. At the lower end of the mold wall I 12, the two thus formed wedge-shaped wall sections of the plastic tube are joined together to form a seal, thus producing the end edge 11.

The plastic tube produced in this way can be filled through the relatively large opening cross-section of the tubular opening section 15, e.g. with toothpaste. The discharge section 18, likewise made of plastic material and elastically deformable for the purposes of positioning, is subsequently pressed onto the tubular opening section 15 and the sealing cap 19 is brought into the closed position.

The tube thus filled can be combined, without an additional carton, with identical tubes, into a larger enclosure carton, to form a package, the level wall sections of adjacent tubes being placed flat against one another so that within the package an arragement of the plastic tubes is formed which otherwise was only possible by packing each individual tube in a carton.

It should be pointed out that the wall sections of the plastic tube can be labelled simultaneously with the shaping in the blow-molding process, to which end, before introducing the plastics tube into the mold, a label is introduced into the mold cavity which carries the printed information and is securely joined to the tube body during the blowing process. This process is known as IML fin mold labelling).

I claim:

1. A plastic tube dispenser comprising:
a main body section comprising a dominant portion of the plastic tube dispenser, said main body section being formed from multiple pairs of diametrically opposed planar walls, said main body section having a substantially constant cross-section along the length of the main body section;
a front end located at one end of said main body section, said front end having a tubular opening section which is smaller in cross-sectional area than the cross sectional area of the main body section; and
a rear end located at an other end of said main body section, said rear end being formed from a pair of walls, said pair of rear end walls being formed from said main body section walls and converging to a substantially straight end edge, said end edge having a widthwise linear dimension no greater than the widest widthwise linear dimension of the cross-section of the main body section.

2. A plastic tube dispenser according to claim 1, further comprising:
an open end on said tubular opening section; and
a tubular discharge section being attached to said open end and having a free end, wherein the opening diameter of the free end is smaller than the diameter of the tubular opening section.

3. A plastic tube dispenser according to claim 2, wherein said main body walls comprise four main body walls and adjacent main body walls form right angles at the points of intersection therebetween.

4. A plastic tube dispenser according to claim 3, wherein the width of the main body walls is the same.

5. A plastic tube dispenser according to claim 2, wherein the cross-section of said main body section is rectangular.

6. A plastic tube dispenser comprising:

a main body section comprising a dominant portion of the plastic tube dispenser, said main body section being formed from multiple pairs of diametrically opposed walls, said main body section having a substantially constant cross-section along the length of the main body section;

a front end located at one end of said main body section, said front end having a tubular opening section which is smaller in cross-sectional area than the cross sectional area of the main body section, said tubular opening section having an open end;

a tubular discharge section being disposed on said open end, said tubular discharge section having an exit end, said exit end having a smaller cross-sectional area than the cross sectional area of the tubular opening section; and a rear end located at an other end of said main body section, said rear end being formed from a pair of walls, said pair of rear end walls being formed from said main body section walls and converging to a substantially straight end edge, said end edge having a widthwise linear dimension no greater than the widest widthwise linear dimension of the cross-section of the main body section.

7. A plastic tube dispenser according to claim 6, wherein said main body walls are planar.

8. A plastic tube dispenser according to claim 6, wherein said main body walls comprise four main body walls and adjacent main body walls form right angles at the points of intersection therebetween.

9. A plastic tube dispenser according to claim 8, wherein the width of the main body walls is the same.

10. A plastic tube dispenser according to claim 8, wherein the cross-section of said main body section is rectangular.

* * * * *